United States Patent
Okamiya (10) Patent No.: US 7,904,769 B2
(45) Date of Patent: Mar. 8, 2011

(54) DEBUGGING SYSTEM AND METHOD INCLUDING AN EMULATOR FOR DEBUGGING A TARGET DEVICE

(75) Inventor: Yuuki Okamiya, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 366 days.

(21) Appl. No.: 12/149,244

(22) Filed: Apr. 29, 2008

(65) Prior Publication Data
US 2008/0282109 A1   Nov. 13, 2008

(30) Foreign Application Priority Data
May 9, 2007 (JP) .................... 2007-124751

(51) Int. Cl.
G01R 31/28 (2006.01)
(52) U.S. Cl. ........................................ 714/724
(58) Field of Classification Search .............. 714/30, 714/724, 733
See application file for complete search history.

(56) References Cited

U.S. PATENT DOCUMENTS

| | | | | |
|---|---|---|---|---|
| 6,499,122 | B1 * | 12/2002 | Coomes | 714/724 |
| 7,047,443 | B2 * | 5/2006 | Kudo et al. | 714/30 |
| 7,185,244 | B2 * | 2/2007 | Kojima et al. | 714/718 |
| 7,584,381 | B2 * | 9/2009 | Kudo | 714/30 |
| 7,590,911 | B1 * | 9/2009 | Azimi et al. | 714/733 |
| 2004/0237013 | A1 * | 11/2004 | Larson et al. | 714/724 |

FOREIGN PATENT DOCUMENTS

| | | |
|---|---|---|
| JP | 6-120929 | 4/1994 |
| JP | 11-282713 | 10/1999 |
| JP | 2006-268727 | 10/2008 |

* cited by examiner

Primary Examiner — James C Kerveros
(74) Attorney, Agent, or Firm — McGinn IP Law Group, PLLC (57) ABSTRACT

A debugging system includes an emulator connected via a communication line for two-way communication and a target device to be debugged by the emulator. The emulator includes a serial signal transmitting unit to transmit a control signal as serial data to the target device and an A/D converter to convert an analog signal into a digital signal and to output the digital signal, the analog signal is input from the target device via the communication line. The target device includes a trace circuit, a serial signal receiving unit to receive the serial data and a D/A converter to convert, in response to the control signal received, trace information into an analog signal, and to output the analog signal, the trace information is output by the trace circuit.

20 Claims, 9 Drawing Sheets

| OUTPUT VALUE OF b4 | OUTPUT VOLTAGE OF b7 | CONVERSION RESULT OF b3 | STORAGE CONTENT OF b1 |
|---|---|---|---|
| 0x01 | 0.0098V | 0x008 | 0x01 (TRANSMISSION) =0x008 (RECEPTION) |
| 0x02 | 0.0195V | 0x00F | 0x02 (TRANSMISSION) =0x00F (RECEPTION) |
| . . . | . . . | . . . | . . . |
| 0xFE | 2.4000V | 0x7F0 | 0xFE (TRANSMISSION) =0x7F0 (RECEPTION) |
| 0xFF | 2.5000V | 0x7FF | 0xFF (TRANSMISSION) =0x7FF (RECEPTION) |

DEBUGGING SYSTEM AND METHOD INCLUDING AN EMULATOR FOR DEBUGGING A TARGET DEVICE

BACKGROUND OF THE INVENTION

1. Field of the Invention

The present invention relates to a debugging system and a debugging method, and more particularly, to a debugging system and a debugging method that allow debugging to be carried out in a state in which a target device is mounted in a target system.

2. Description of Related Art

In recent years, as a method of developing a program to be installed in a microcomputer (hereinafter, referred to as "micro"), there is known on-chip debugging that allows debugging to be carried out in a state in which a target device is mounted in a target system. To realize the on-chip debugging, there is a need to provide a debug interface dedicated to the target device. The debug interface is allocated to external terminals of the target device. Accordingly, it is necessary to reduce the number of debug interface terminals unnecessary for a user as much as possible. Further, in order to reduce costs for a development environment, it is necessary to obtain trace data in real time.

Figure 7:
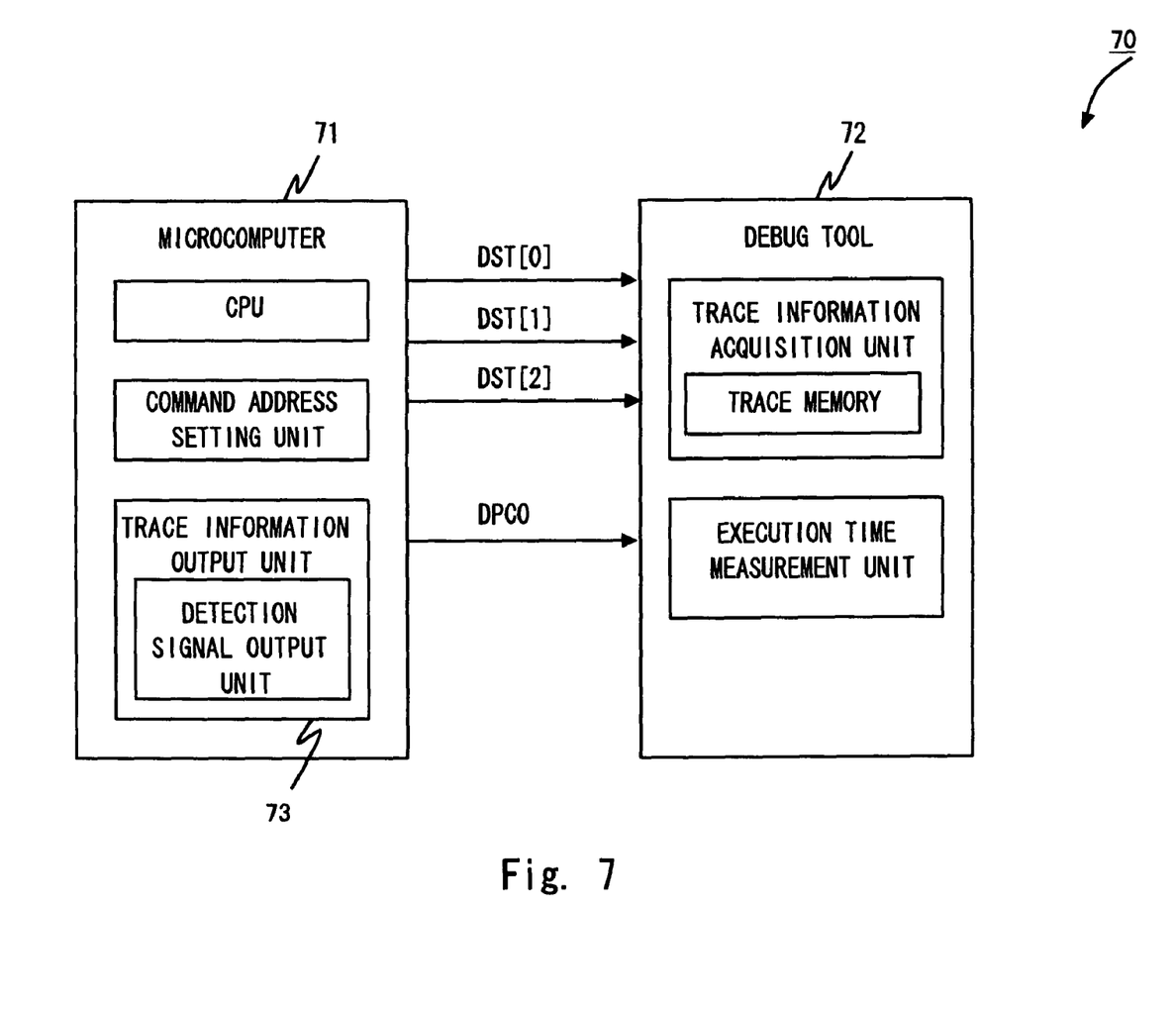
FIG. 7 is a diagram showing a debugging system of a related art.
Figure 8:
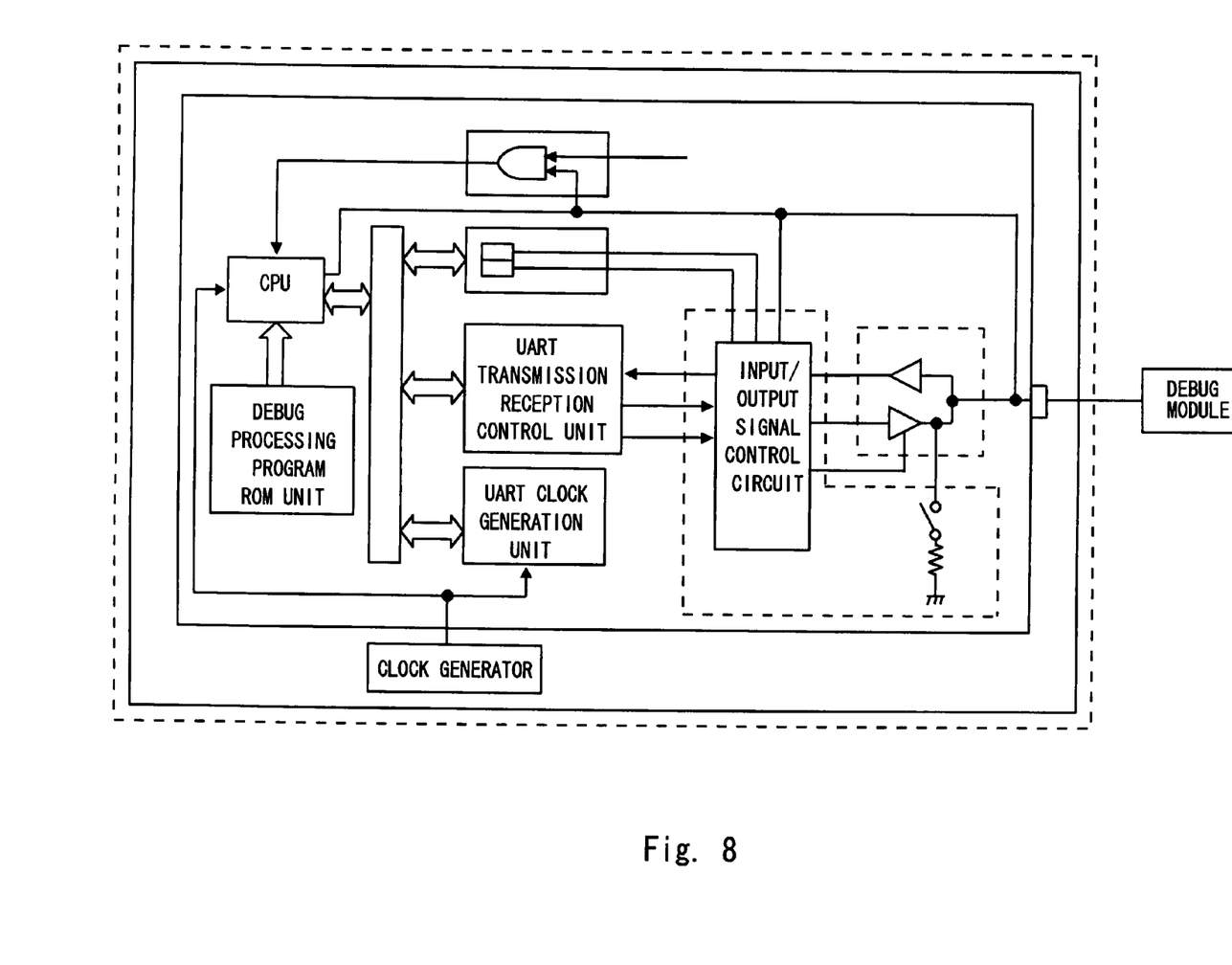
FIG. 8 is a diagram showing a debugging system of a related art.
Figure 9:
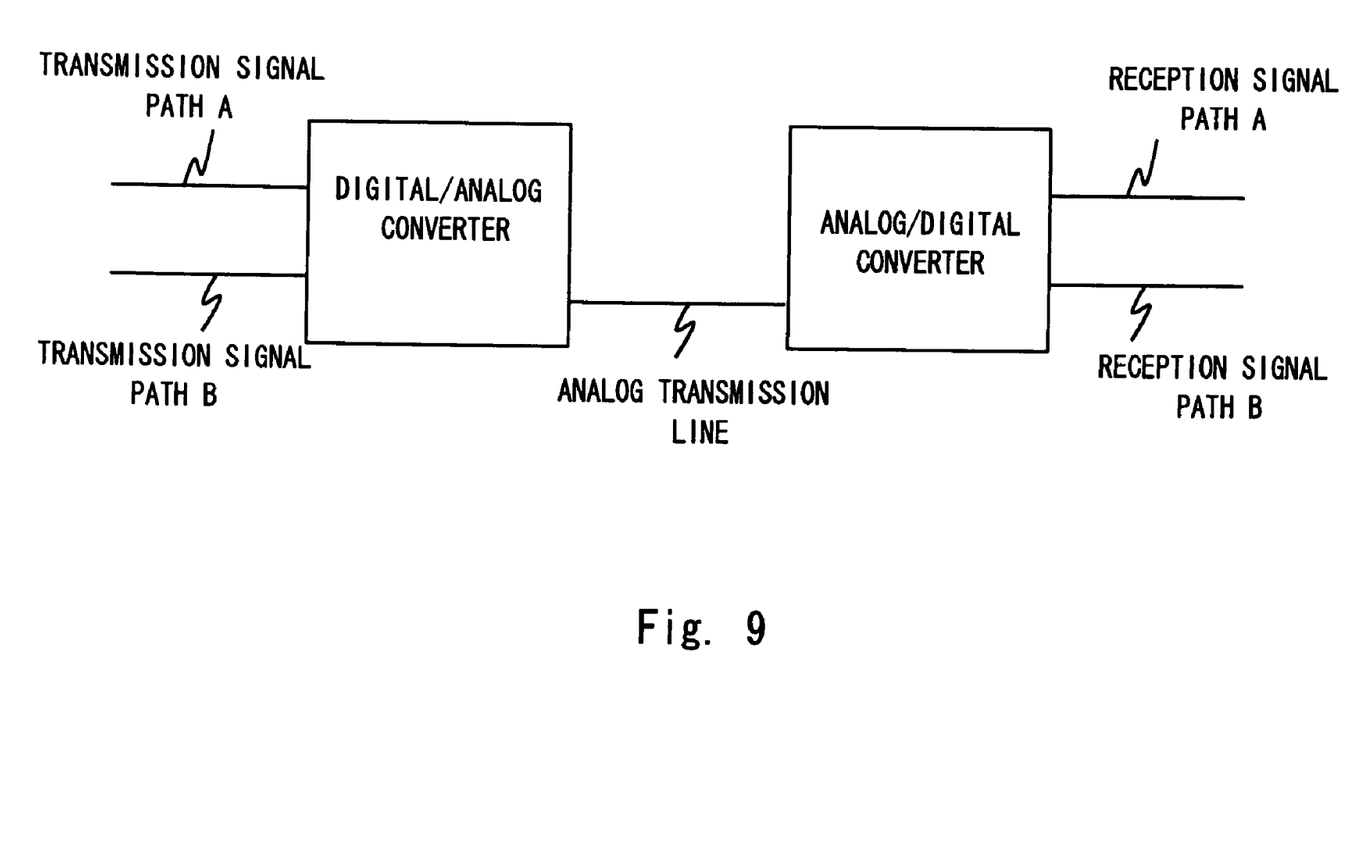
FIG. 9 is a diagram showing a debugging system of a related art.

FIG. 7 shows a debugging system disclosed in Japanese Unexamined Patent Application Publication No. 11-282713 (Kudo et al.). A debugging system 70 includes a microcomputer 71 and a debug tool 72. A trace information output unit 73 provided in the micro outputs trace information to the debug tool from dedicated four terminals. In such a configuration, the debug tool 72 can obtain trace data in real time. Further, Japanese Unexamined Patent Application Publication No. 2006-268727 (Fuse et al.) discloses that on-chip debugging is realized using a single debug terminal as a debug terminal unnecessary for a user (see FIG. 8). Note that Japanese Unexamined Patent Application Publication No. 06-120929 (Ii) discloses an analog transmission circuit for transmitting multi-value data via an analog transmission line (see FIG. 9).

However, in the technologies disclosed in Kudo et al. and Fuse et al., it is difficult to realize the debug interface with a small number of terminals and to obtain trace data in real time. In other words, in the debugging system disclosed in Kudo et al., in order to obtain trace data in real time, there is a need to secure at least four debug interface terminals unnecessary for a user. On the other hand, in a debugging system disclosed in Fuse et al., the debug interface is realized with a single terminal. However, the debugging system is incapable of receiving trace data because it is necessary to transfer a large amount of data in receiving the trace data. Further, in the analog transmission circuit disclosed in Ii, two-way communication is not performed. Accordingly, in the analog transmission circuit, it is difficult to realize on-chip debugging which requires two-way data communication.

As described above, it has been difficult for conventional debugging systems to receive trace data with a small number of terminals in real time.

SUMMARY

In one embodiment of the present invention, there is provided a debugging system including: an emulator connected via a communication line for two-way communication and a target device to be debugged by the emulator. The emulator includes: a serial signal transmitting unit to transmit a control signal as serial data to the target device and an A/D converter to convert an analog signal into a digital signal and to output the digital signal, the analog signal is input from the target device via the communication line. The target device includes: a trace circuit, a serial signal receiving unit to receive the serial data and a D/A converter to convert, in response to the control signal received, trace information into an analog signal, and to output the analog signal, the trace information is output by the trace circuit.

In another embodiment of the present invention, there is provided a debugging method of debugging a target device to be debugged via a communication line for two-way communication, including: transmitting a control signal as serial data to the target device via the communication line; and converting, in response to the control signal received, trace information, which is output by a trace circuit provided in the target device, into an analog signal, and outputting the analog signal via the communication line.

According to the present invention, trace data can be received at one terminal in real time.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

First Embodiment

Figure 1:
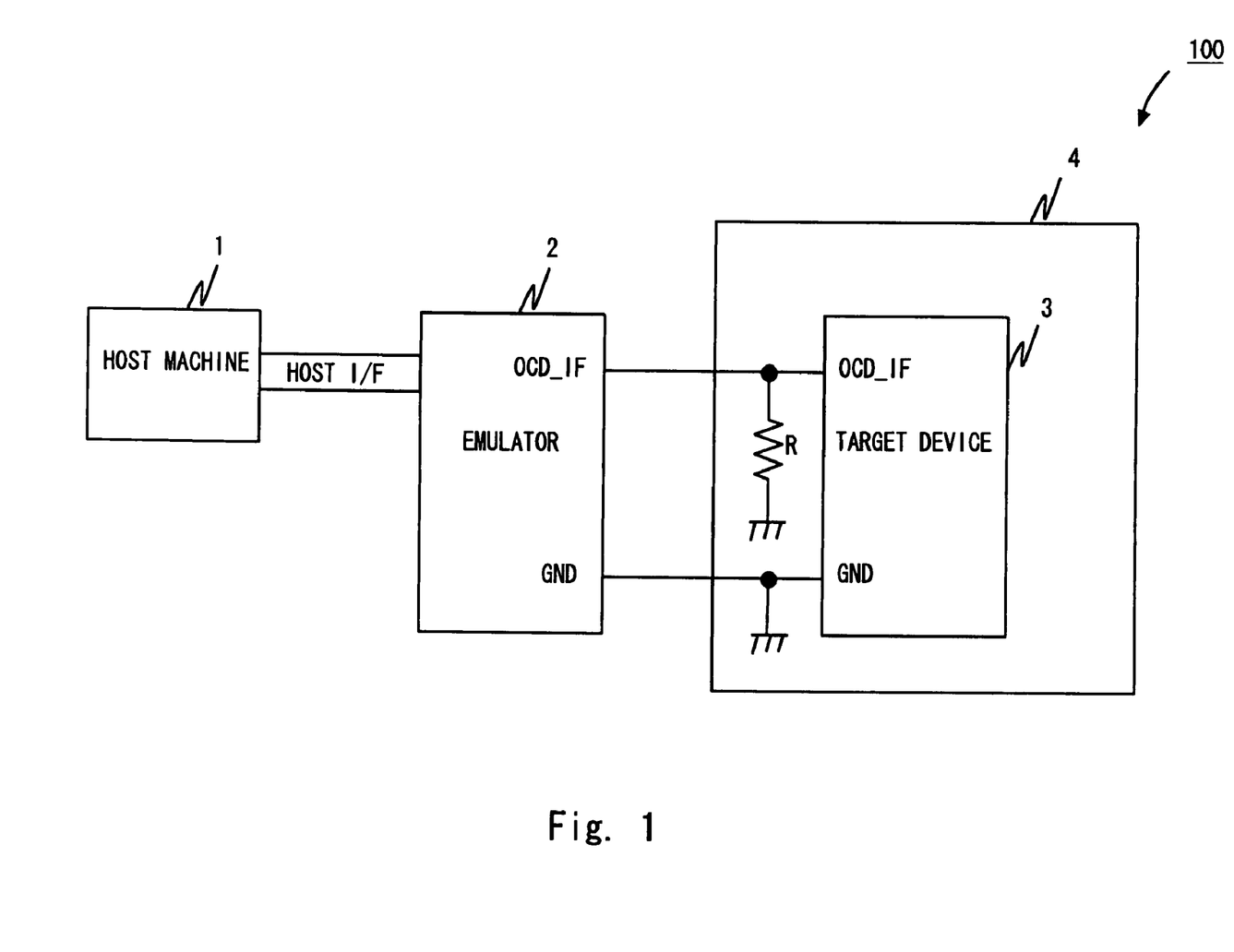
FIG. 1 is a diagram showing a debugging system according to a first embodiment of the present invention.

Hereinafter, embodiments of the present invention will be described with reference to the drawings. FIG. 1 is a block diagram showing a debugging system according to a first embodiment of the present invention. As shown in FIG. 1, a debugging system 100 according to the first embodiment includes a host machine 1, an on-chip debug emulator (hereinafter, referred to as "OCD emulator") 2, and a target system 4. The target system 4 has a debug target device (for example, micro) 3 mounted therein.

The host machine 1 is, for example, a computer installed with debugging software. The OCD emulator 2 emulates an operation of the debug target device 3 mounted in the target system. Further, the OCD emulator 2 is connected to the host machine 1 through a host interface (hereinafter, referred to as "host I/F"). The target system 4 is connected to the OCD emulator 2 via an on-chip debug interface (hereinafter, referred to as "on-chip debug I/F"). The target system 4 is a system having a configuration necessary for the target system other than the debug target device 3. The debug target device 3 is a semiconductor device such as a micro mounted in the target system 4.

Figure 2:
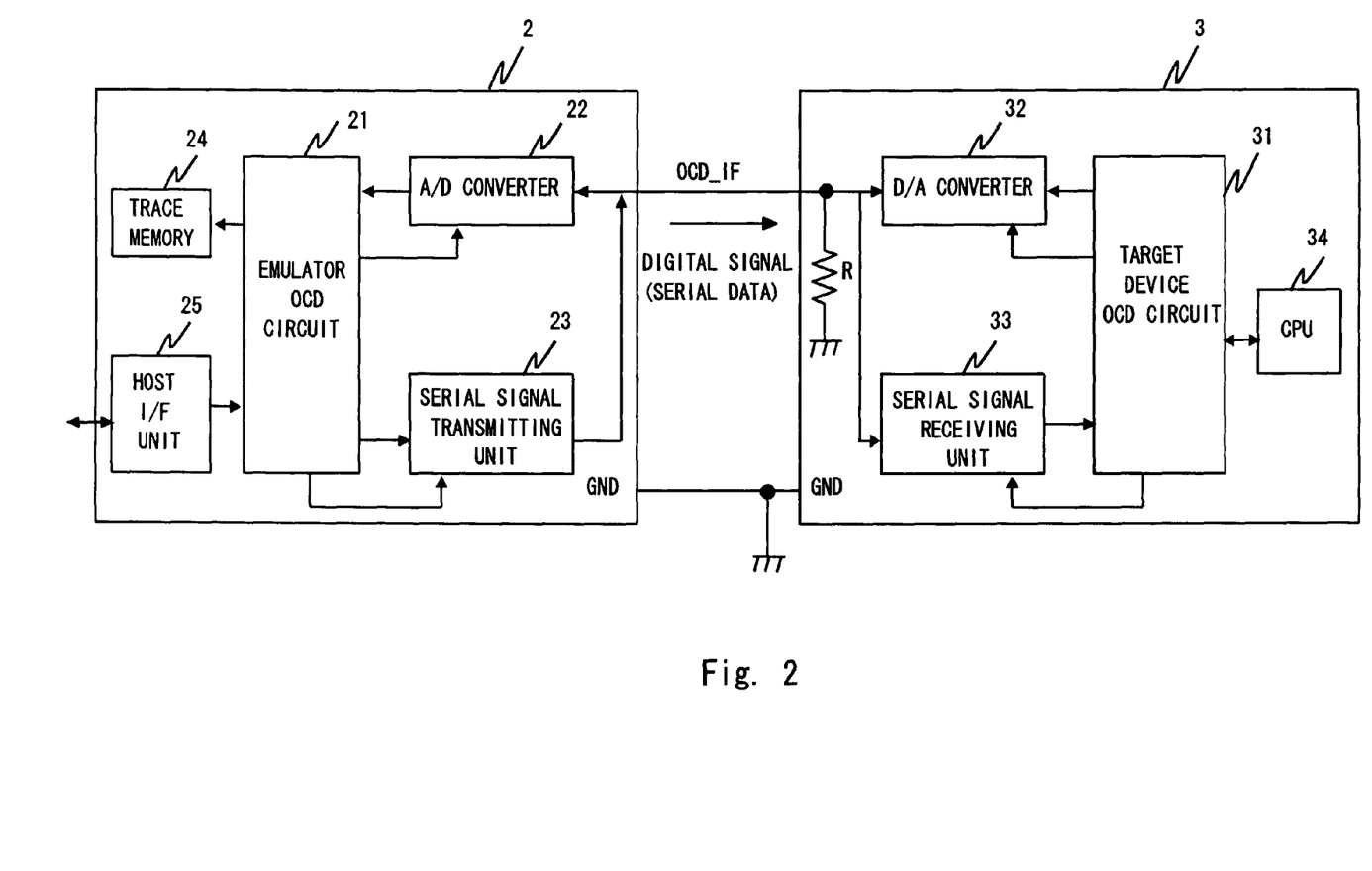
FIG. 2 is a diagram showing details of the debugging system according to the first embodiment.
Figure 3:
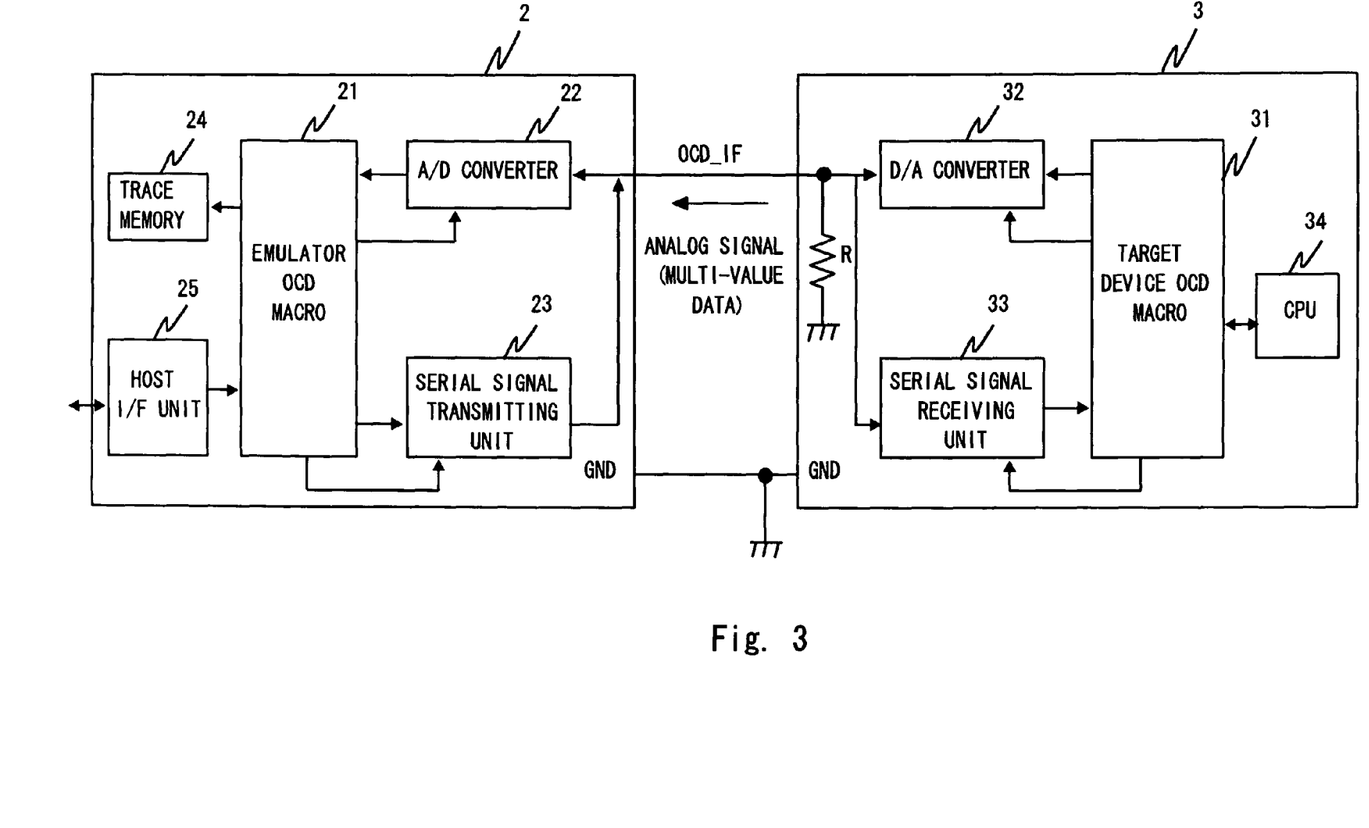
FIG. 3 is a diagram showing details of the debugging system according to the first embodiment.

FIG. 2 is a diagram showing details of an internal configuration of each of the emulator 2 and the target device 3 that are connected to each other through the on-chip debug I/F shown in FIG. 1. Referring to FIGS. 2 and 3, the emulator 2 and the target device 3 will be described in detail below.

The emulator 2 includes an emulator OCD circuit 21, an A/D converter 22, a serial signal transmitting unit 23, a trace memory 24, and a host I/F unit 25.

The emulator OCD circuit 21 is a circuit for outputting, to the serial signal transmitting unit 23, a control signal which is output from the host machine 1 through the host I/F unit 25 so as to control the target device. To the emulator OCD circuit 21, trace information output by the target device 3 is input via the A/D converter 22.

The A/D converter 22 receives the trace information output by the target device 3 as an analog signal. Then, the analog signal is converted into a digital signal to be output to the OCD circuit.

The serial signal transmitting unit 23 transmits the control signal, which is output from the emulator OCD circuit 21, to a serial signal receiving unit 33 through the on-chip debug I/F. Note that the control signal is transmitted as a digital signal from the serial signal transmitting unit 23 to the serial signal receiving unit 33.

The trace memory 24 stores the trace information, which is output from the target device 3 through the emulator OCD circuit 21, as digital data.

The target device 3 includes a target device OCD circuit 31, a D/A converter 32, the serial receiving unit 33, a trace circuit (hereinafter, referred to as "CPU") 34, and a resistor R.

The serial signal receiving unit 33 receives the control signal transmitted as serial data from the serial signal transmitting unit 23 via the on-chip debug I/F and outputs the serial data to the target device OCD circuit 31.

The target device OCD circuit 31 inputs the control signal output by the serial signal receiving unit 33. Then, the target device OCD circuit 31 controls the CPU 34 in response to the input control signal. In addition, the target device OCD circuit 31 outputs the trace information, which is output from the CPU 34, to the D/A converter 32.

The CPU 34 outputs the trace information in response to the control signal output by the target device OCD circuit 31.

The D/A converter 32 converts the trace information input as digital data into an analog signal. The trace information converted into the analog signal is input to the A/D converter 22 of the OCD emulator 2 via the on-chip debug I/F. The resistor R is connected to each of the D/A converter 32 and a ground potential.

Figure 4:
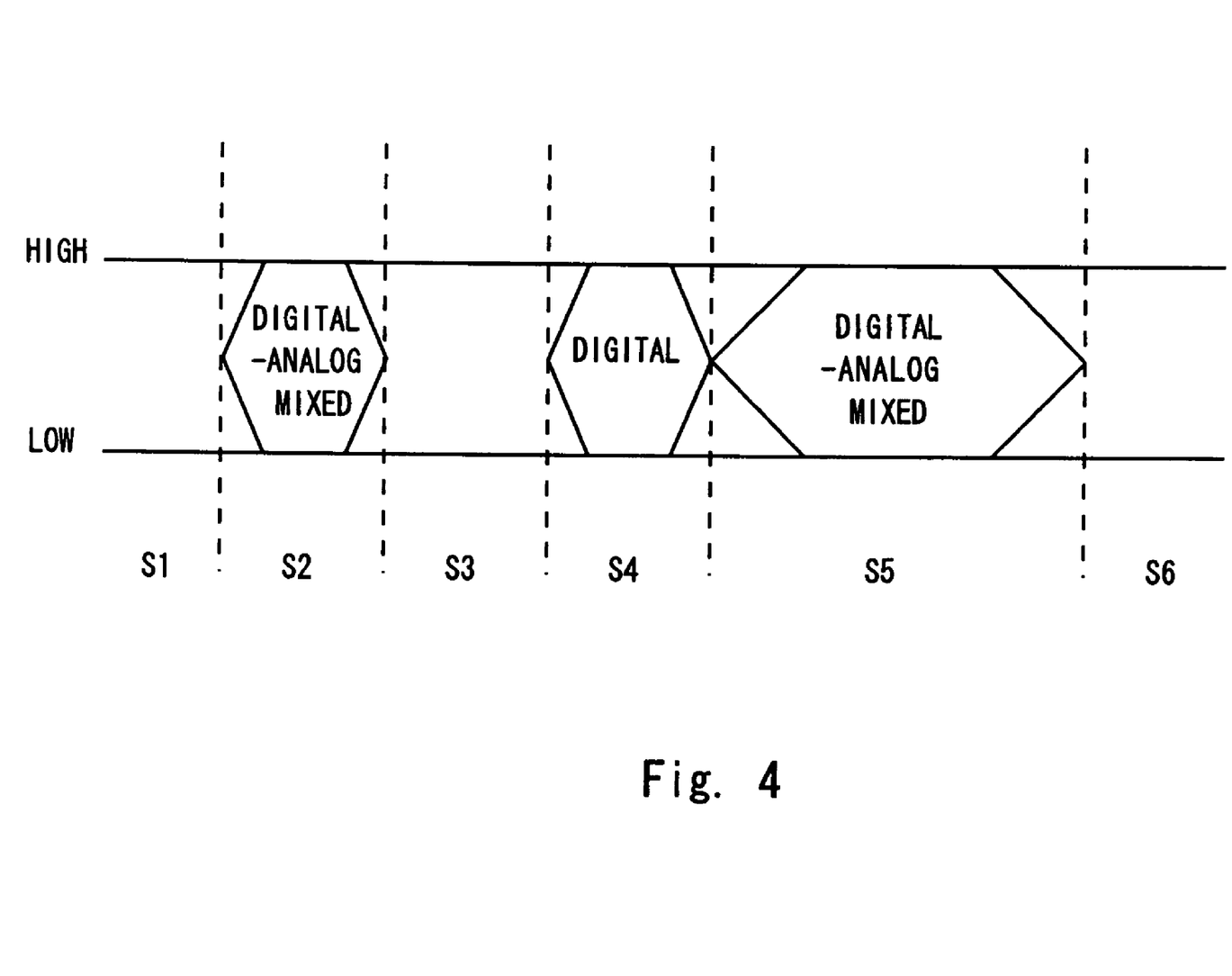
FIG. 4 is a timing chart of a debug interface according to the first embodiment.

Referring to FIGS. 2 and 3 and a timing chart shown in FIG. 4, a detailed description is given of operations of the OCD emulator 2 and the target device 3 that are connected to each other through the on-chip debug I/F in the above-mentioned manner. Note that the timing chart of FIG. 4 shows a communication state of the on-chip debug I/F.

First, a description is given of a case where the target device performs a normal operation. In this case, communication between the OCD emulator 2 and the target device 3 is not performed. Accordingly, an analog signal or a digital signal is not input/output through the on-chip debug I/F (see S1 of FIG. 4).

Next, a description is given of a case of debugging the target device 3. First, the OCD emulator 2 transmits specific serial data to the target device 3. Based on the transmission of the serial data, the target device 3 switches to a debug mode. When the target device 3 switches to the debug mode, detection of an error on an analog communication line is performed. Specifically, converted data obtained in analog communication is stored. A method of storing the converted data will be described later. In this manner, when the target device 3 switches to the debug mode, the communication is performed with both serial and analog signals. Accordingly, the on-chip debug I/F is in a state in which digital and analog signals are mixed (see S2 of FIG. 4).

When the target device 3 switches to the debug mode, the CPU is brought into a break state. In this case, signals are not input/output via the on-chip debug I/F (see S3 of FIG. 4).

Next, the CPU is allowed to operate actually so as to start a debugging operation. First, the emulator OCD circuit 21 inputs a control signal which is output from the host machine 1 so as to control the target device. The control signal is transmitted as serial data from the serial signal transmitting unit 23 to the target device 3 via the on-chip device I/F (see FIG. 2). In other words, the on-chip debug I/F allows communication using digital signals (see S4 of FIG. 4). Note that, when the OCD emulator 2 transmits specific serial data to the target device 3, the A/D converter 22 and the D/A converter 32 are each set to a high-impedance state. The high-impedance state of the A/D converter 22 and that of the D/A converter 32 are controlled by the emulator OCD circuit 21 and the target device OCD circuit 31, respectively.

The serial signal receiving unit 33 outputs the control signal, which is input as serial data, to the target device OCD circuit 31. In response to the control signal, the target device OCD circuit 31 instructs the CPU 34 to execute a program. Then, the target device OCD circuit 31 obtains the trace information output from the CPU 34. The trace information indicates, for example, branch trace or access trace.

The trace information input to the target device OCD circuit 31 is output to the D/A converter 32. The D/A converter 32 converts the trace information input as digital data into analog data, and outputs the analog data to the A/D converter 22 of the OCD emulator 2 through the on-chip debug I/F (see FIG. 3).

The A/D converter 22 converts the trace information input as analog data into digital data. Then, the trace information is output to the emulator OCD circuit 21. The emulator OCD circuit 21 outputs the trace information to the trace memory 24. The trace memory 24 stores the trace information as digital data.

It is necessary to force the CPU 34 into a break state during a time period when the trace information output from the CPU 34 is transmitted as an analog signal to the OCD emulator 2. Accordingly, the OCD emulator 2 transmits a break command as serial data to the CPU 34 at predetermined intervals. A forced break operation for the CPU 34 is executed by the host machine, for example, when a malfunction occurs. As a result, the on-chip debug I/F is in the state in which analog and digital signals are mixed (see S5 of FIG. 4).

When the target device 3 receives a break signal output by the OCD emulator 2, the CPU 34 is brought into the break state. As a result, the communication is not performed through the on-chip debug I/F (see S6 of FIG. 4).

In this manner, the OCD emulator 2 transmits the control signal for requesting the trace information, to the target device 3 through the on-chip debug I/F. Upon reception of the control signal, the target device 3 outputs the trace information, which is output from the CPU 34, as an analog signal via the on-chip debug I/F. The OCD emulator 2 converts the trace information received as the analog signal into a digital signal. Then, the trace information thus obtained is stored in the trace memory 24.

Figure 5:
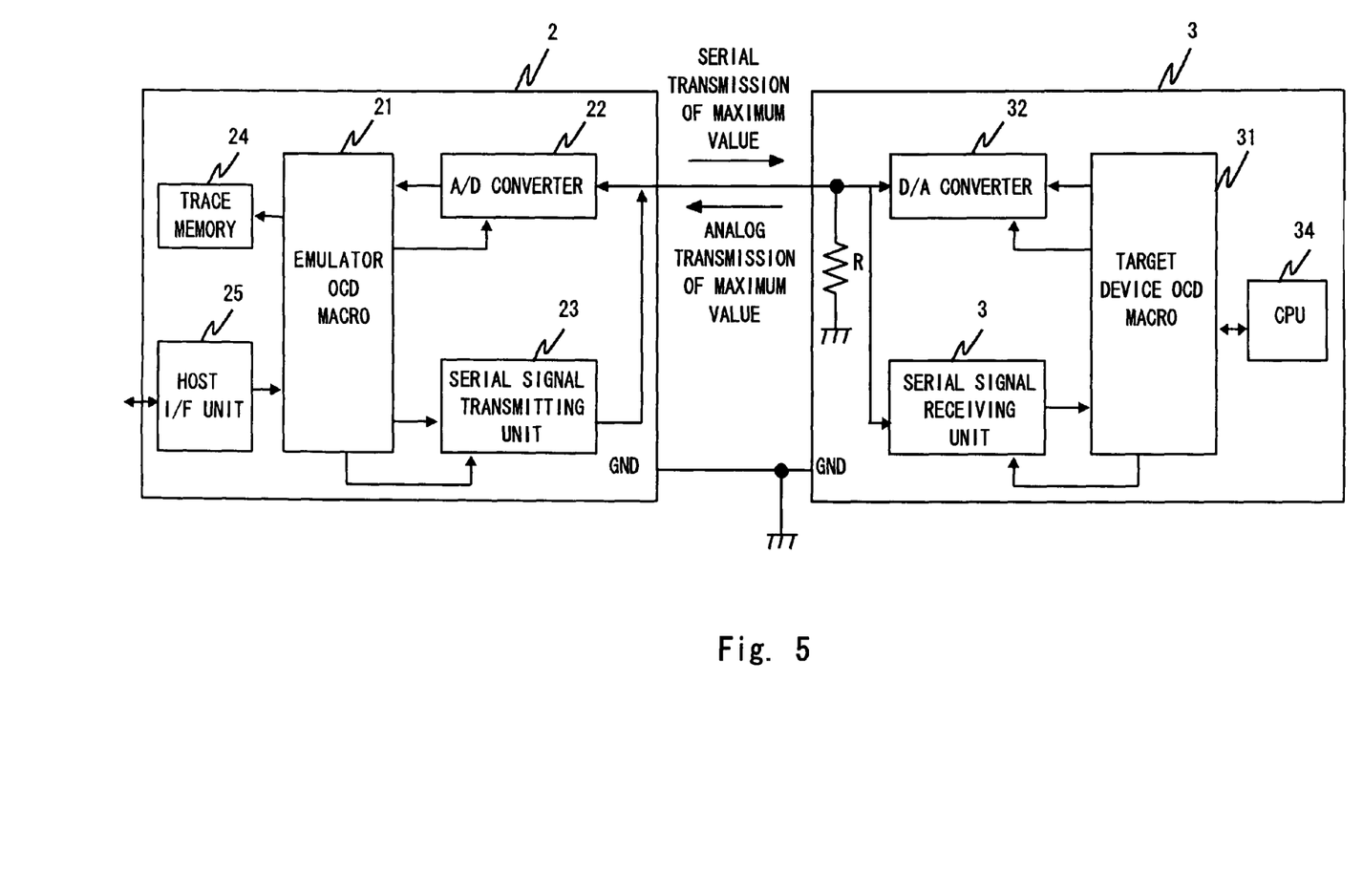
FIG. 5 is a diagram showing storage of converted data according to the first embodiment.
Figure 6:
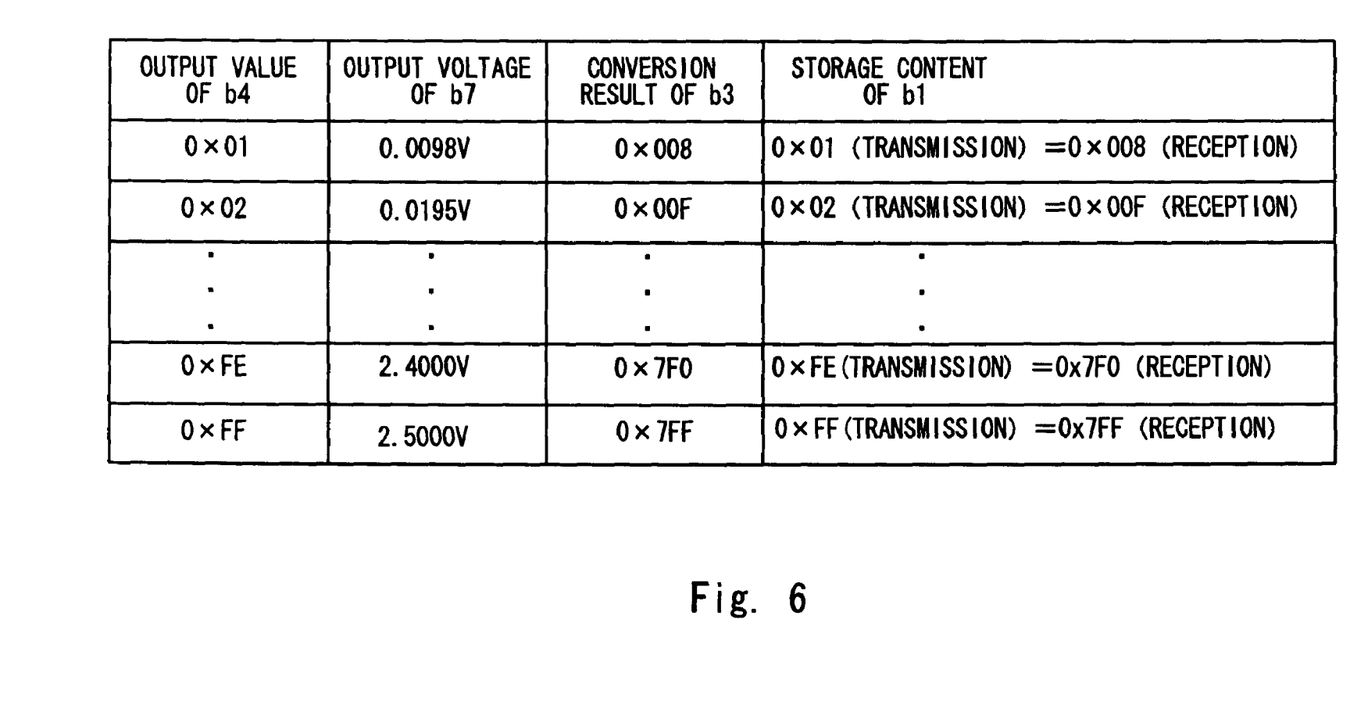
FIG. 6 is a diagram showing storage of the converted data according to the first embodiment.

Last, referring to FIGS. 5 and 6, a description is given of the method of storing converted data obtained in the analog communication. First, it is assumed that the A/D converter 22 of the OCD emulator 2 converts an input voltage whose maximum voltage is 5 V, into 0xFFF. In this case, a packet width for serial communication is 8 bits. A maximum value of 0xFF is transmitted from the OCD emulator 2 to the target device 3.

The target device 3 receives the maximum value of 0xFF, and then outputs a maximum voltage of an analog signal output to the OCD emulator 2. In this case, it is assumed that the maximum voltage of the target device 3 is 2.5 V. The OCD emulator 2 stores received data of 0x7FF, which is obtained as a result of subjecting the analog voltage to digital conversion, and transmitted data of 0xFF so as to be associated with each other.

In a similar manner, 0x01 is transmitted from the OCD emulator 2 to the target device 3. The target device 3 receives 0x01, and then outputs a reference voltage multiplied by 1/256 (8 bits) as an analog output to the OCD emulator 2. Since the reference voltage of the target device 3 is assumed as 2.5 V, 0.0098 V is output. The OCD emulator 2 converts the input analog voltage into a digital voltage, and then holds a value of the digital voltage obtained by conversion. After that, the OCD emulator 2 repeats the above process also for 0x02 to 0xFE. Then, all the data is converted, and pieces of converted data are associated with each other to be stored.

Note that there arises a need to verify the lowest bit of the communication data which is reliable in an analog line. On the current assumption, with respect to the maximum value 0xFF of serial data, the maximum value of 0x7FF is obtained as a result on the side of the emulator. Accordingly, an expected value is obtained from the result in advance so as to be compared with the value of the OCD circuit on the side of the emulator, whereby consistency therebetween is checked.

As described above, in the embodiments of the present invention, the OCD emulator performs the debugging operation for the target device. In the debugging operation, the OCD emulator and the target device communicate with each other via the on-chip debug I/F. The communication via the on-chip debug I/F is performed in the state in which digital and analog signals are mixed. In other words, the control signal is transmitted as digital data by the OCD emulator to the target device so as to obtain the trace information. On the other hand, the trace information, which is output by the target device to the OCD emulator based on the input digital data, is transmitted as analog data.

As described above, in the present embodiment, analog signals are available via a debug I/F. As a result, the number of debug interface terminals can be reduced to one. Accordingly, terminals dedicated to debugging, which are unnecessary for a user, can be reduced.

Further, trace data can be obtained in real time. Accordingly, the debugging efficiency can be improved.

Further, since trace data can be obtained in real time, a high-cost in-circuit emulator (ICE) becomes unnecessary. Accordingly, costs for the development environment can be reduced.

Further, since the emulator transmits command-level data to the target device, there is no need to perform analog output. In other words, by digitizing the emulator, an increase in circuit scale can be suppressed.

It is apparent that the present invention is not limited to the above embodiments, but may be modified and changed without departing from the scope and spirit of the invention.

What is claimed is:

1. A debugging system, comprising:
   an emulator connected via a communication line for two-way communication; and
   a target device to be debugged by the emulator,
   wherein the emulator includes:
      a serial signal transmitting unit to transmit a control signal to the target device; and
      an A/D converter to convert an analog signal into a digital signal and to output the digital signal, the analog signal being input from the target device via the communication line, and
   wherein the target device includes:
      a trace circuit;
      a serial signal receiving unit to receive the control signal; and
      a D/A converter to convert, in response to the control signal received, trace information into an analog signal, and to output the analog signal, the trace information being output by the trace circuit.

2. The debugging system according to claim 1, wherein the emulator further includes a memory unit to store a maximum voltage output by the target device and a maximum value of digital data output by the serial signal transmitting unit so as to be associated with each other.

3. The debugging system according to claim 1, wherein the D/A converter divides the trace information converted into the analog signal, and outputs the analog signal.

4. The debugging system according to claim 1, wherein the emulator forcibly terminates reception of the trace information converted into the analog signal.

5. A debugging circuit, comprising:
   the trace circuit according to claim 1 serving as a CPU.

6. The debugging system according to claim 1, wherein the control signal is output from a host machine placed in the emulator through a host interface to control the target device.

7. The debugging system according to claim 1, further comprising:
   an emulator OCD (on-chip debug) circuit for outputting the control signal to the serial signal transmitting unit.

8. The debugging system according to claim 7, wherein the A/D converter converts the trace information output by the target device as the analog signal into the digital signal to be output to the emulator OCD circuit.

9. The debugging system according to claim 7, wherein the serial signal transmitting unit transmits the control signal received from the emulator OCD circuit to the serial signal receiving unit.

10. The debugging system according to claim 7, wherein the emulator OCD circuit transmits a break command to the trace circuit at predetermined intervals such that the emulator executes a forced break operation for the trace circuit when a malfunction occurs.

11. The debugging system according to claim 7, wherein the emulator further comprises:

a trace memory to store the trace information as the digital data, wherein after the A/D converter converts the trace information into the digital data, the trace information is output to the emulator OCD circuit and then the emulator OCD circuit outputs the trace information to the trace memory.

12. The debugging system according to claim 1, wherein the serial signal transmitting unit transmits the control signal to the serial signal receiving unit as the digital signal.

13. The debugging system according to claim 1, further comprising:

a target device OCD (on-chip debug) circuit that receives the control signal from the serial signal receiving unit.

14. The debugging system according to claim 13, wherein the target device OCD circuit controls the trace circuit in response to the control signal received by the target device OCD circuit.

15. The debugging system according to claim 13, wherein the trace circuit outputs the trace information in response to an output of the control signal from the target device OCD circuit.

16. The debugging system according to claim 13, wherein the D/A converter converts the trace information input from the target device OCD circuit as the digital data into the analog signal.

17. A debugging method of debugging a program stored in a target device externally via a communication line, said method comprising:

inputting a control signal to the target device via the communication line;

converting a digital signal associated with trace data of the target device into an analog signal; and receiving the analog signal via the communication line.

18. The debugging method according to claim 17, further comprising:

associating a maximum value of a voltage output by the target device with a maximum value of the digital signal to convert the analog signal received into digital data.

19. The debugging method according to claim 18, wherein the converting of the digital signal associated with the trace data into the analog signal is performed in the target device.

20. The debugging method according to claim 17, wherein the converting of the digital signal associated with the trace data into the analog signal is performed in the target device.

* * * * *